United States Patent
Henderkott et al.

(10) Patent No.: US 10,450,871 B2
(45) Date of Patent: Oct. 22, 2019

(54) REPAIR OF DUAL WALLED METALLIC COMPONENTS USING DIRECTED ENERGY DEPOSITION MATERIAL ADDITION

(71) Applicant: Rolls-Royce Corporation, Indianapolis, IN (US)

(72) Inventors: Joseph Peter Henderkott, Westfield, IN (US); Quinlan Yee Shuck, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 364 days.

(21) Appl. No.: 15/053,057

(22) Filed: Feb. 25, 2016

(65) Prior Publication Data

US 2016/0251965 A1  Sep. 1, 2016

Related U.S. Application Data

(60) Provisional application No. 62/121,248, filed on Feb. 26, 2015.

(51) Int. Cl.
*F01D 5/14* (2006.01)
*B23K 1/00* (2006.01)
(Continued)

(52) U.S. Cl.
CPC ............ *F01D 5/147* (2013.01); *B23K 1/0018* (2013.01); *B23K 26/342* (2015.10); *B23K 26/38* (2013.01);
(Continued)

(58) Field of Classification Search
CPC .......... F01D 5/147; F01D 5/288; F01D 5/005; F01D 5/186; B23P 6/007; F23R 3/04;
(Continued)

(56) References Cited

U.S. PATENT DOCUMENTS 3,706,203 A   12/1972  Goldberg et al.
3,806,276 A   4/1974   Aspinwall
(Continued)

FOREIGN PATENT DOCUMENTS

CN   105091030 A    11/2015
DE   10319494 A1    11/2004
(Continued)

OTHER PUBLICATIONS

Extended European Search Report from counterpart European Application No. 16157452.0, dated Jul. 28, 2016, 7 pp.
(Continued)

*Primary Examiner* — Moshe Wilensky
(74) *Attorney, Agent, or Firm* — Shumaker & Sieffert, P.A.

(57) ABSTRACT

A technique for repairing a dual walled component comprising a spar comprising a plurality of pedestals and a coversheet attached to the plurality of pedestals may include removing a damaged portion of the coversheet from the dual walled component to expose a plurality of exposed pedestals and define a repair location and an adjacent coversheet portion. The technique also may include attaching a material to the plurality of exposed pedestals and adjacent coversheet portion using directed energy deposition material addition to form a repaired coversheet portion.

9 Claims, 7 Drawing Sheets

(51) Int. Cl.
*B23K 26/342* (2014.01)
*B23K 26/38* (2014.01)
*F01D 5/18* (2006.01)
*F23R 3/00* (2006.01)
*F23R 3/04* (2006.01)
*B23P 6/00* (2006.01)
*F01D 5/00* (2006.01)
*F01D 5/28* (2006.01)
*B23K 101/00* (2006.01)

(52) U.S. Cl.
CPC .............. *B23P 6/007* (2013.01); *F01D 5/005* (2013.01); *F01D 5/186* (2013.01); *F01D 5/288* (2013.01); *F23R 3/002* (2013.01); *F23R 3/04* (2013.01); *B23K 2101/001* (2018.08); *F05D 2220/32* (2013.01); *F05D 2230/232* (2013.01); *F05D 2230/233* (2013.01); *F05D 2230/234* (2013.01); *F05D 2230/30* (2013.01); *F05D 2240/35* (2013.01); *F05D 2260/202* (2013.01); *F05D 2300/17* (2013.01)

(58) Field of Classification Search
CPC ....... F23R 3/002; B23K 26/342; B23K 26/38; B23K 1/0018; B23K 2101/001
See application file for complete search history.

(56) References Cited

U.S. PATENT DOCUMENTS

| | | |
|---|---|---|
| 4,695,247 A | 9/1987 | Enzaki et al. |
| 5,640,767 A | 6/1997 | Jackson et al. |
| 5,976,337 A | 11/1999 | Korinko et al. |
| 6,172,327 B1 | 1/2001 | Aleshin et al. |
| 6,199,746 B1 | 3/2001 | Dupree et al. |
| 6,214,248 B1 | 4/2001 | Browning et al. |
| 6,575,702 B2 | 6/2003 | Jackson et al. |
| 6,602,053 B2 | 8/2003 | Subramanian et al. |
| 6,837,417 B2 | 1/2005 | Srinivasan |
| 7,051,435 B1 | 5/2006 | Subramanian et al. |
| 7,080,971 B2 | 7/2006 | Wilson et al. |
| 7,146,725 B2 | 12/2006 | Kottilingam et al. |
| 7,484,928 B2 | 2/2009 | Arness et al. |
| 7,761,989 B2 | 7/2010 | Lutz et al. |
| 7,966,707 B2 | 6/2011 | Szela et al. |
| 8,070,450 B1 | 12/2011 | Ryznic et al. |
| 8,087,565 B2 | 1/2012 | Kottilingam et al. |
| 8,247,733 B2 | 8/2012 | Zhu |
| 8,356,409 B2 | 1/2013 | Perret |
| 8,528,208 B2 | 9/2013 | Rebak et al. |
| 8,539,659 B2 | 9/2013 | Szela et al. |
| 8,555,500 B2 | 10/2013 | Vossberg et al. |
| 8,739,404 B2 | 6/2014 | Bunker et al. |
| 8,800,298 B2 | 8/2014 | Ladd et al. |
| 8,875,392 B2 | 11/2014 | Richter |
| 9,476,306 B2 | 10/2016 | Bunker |
| 2003/0026697 A1 | 2/2003 | Subramanian et al. |
| 2004/0086635 A1 | 5/2004 | Grossklaus et al. |
| 2005/0217110 A1 | 10/2005 | Topal |
| 2006/0120869 A1 | 6/2006 | Wilson et al. |
| 2007/0044306 A1 | 3/2007 | Szela et al. |
| 2007/0163684 A1 | 7/2007 | Hu |
| 2008/0011813 A1 | 1/2008 | Bucci et al. |
| 2009/0026182 A1 | 1/2009 | Hu et al. |
| 2009/0194247 A1 | 8/2009 | Kriegl |
| 2009/0255116 A1 | 10/2009 | McMasters et al. |
| 2009/0324841 A1 | 12/2009 | Arrell et al. |
| 2010/0176097 A1* | 7/2010 | Zhu ........................ B23K 26/03 219/121.63 |
| 2010/0257733 A1* | 10/2010 | Guo ........................ B23K 26/18 29/889.1 |
| 2011/0051179 A1 | 3/2011 | Iga |
| 2011/0185739 A1 | 8/2011 | Bronson et al. |
| 2012/0222306 A1 | 9/2012 | Mittendorf et al. |
| 2014/0003948 A1 | 1/2014 | Dubs et al. |
| 2014/0169943 A1 | 6/2014 | Bunker et al. |
| 2014/0259666 A1 | 9/2014 | Baughman et al. |
| 2014/0302278 A1 | 10/2014 | Bunker |
| 2015/0047168 A1 | 2/2015 | James et al. |
| 2016/0032766 A1 | 2/2016 | Bunker et al. |
| 2018/0093354 A1 | 4/2018 | Cui et al. |

FOREIGN PATENT DOCUMENTS

| | | |
|---|---|---|
| DE | 102006005364 A1 | 8/2007 |
| DE | 102008007820 A1 | 8/2009 |
| DE | 102008058140 A1 | 5/2010 |
| EP | 1503144 A1 | 2/2005 |
| EP | 1528322 A2 | 5/2005 |
| EP | 1584702 A1 | 10/2005 |
| EP | 1803521 A1 | 7/2007 |
| EP | 1880793 A2 | 1/2008 |
| EP | 1884306 A1 | 2/2008 |
| EP | 2206575 A1 | 7/2010 |
| EP | 2578720 A2 | 4/2013 |
| EP | 3061556 A1 | 8/2016 |
| WO | 2012092279 A1 | 7/2012 |
| WO | 2015147929 A2 | 10/2015 |

OTHER PUBLICATIONS

Response to Search Opinion dated Jul. 28, 2016, from counterpart European Application No. 16157452.0, filed Feb. 23, 2017, 8 pp.
Intent to Grant dated Oct. 27, 2017, from counterpart European Application No. 16157452.0, 7 pp.
U.S. Appl. No. 15/264,098, filed Sep. 13, 2016, by Bruce Varney.
Search Report and Written Opinion from counterpart Singaporean Application No. 10201601466Q, dated Jan. 4, 2019, 8 pp.
Notice of Opposition from European Application No. 16157440.5, dated Jan. 23, 2019, 17 pp.
Notice of Opposition, and translation thereof, from counterpart European Application No. 16157440.5, dated Jan. 23, 2019, 31 pp.

\* cited by examiner

REPAIR OF DUAL WALLED METALLIC COMPONENTS USING DIRECTED ENERGY DEPOSITION MATERIAL ADDITION

This application claims the benefit of U.S. Provisional Application No. 62/121,248 filed Feb. 26, 2015, which is incorporated herein by reference in its entirety.

TECHNICAL FIELD

The disclosure relates to techniques for repairing dual walled metallic components using directed energy deposition material addition.

BACKGROUND

Dual walled components may be used in high temperature mechanical systems, such as gas turbine engines. A dual walled component may include a spar, which provides structural support and is the main load bearing element of the dual walled component. The spar may include a plurality of pedestals to which a coversheet or outer wall is attached. The coversheet defines the outer surface of the dual walled component, and may function as a heat shield. Cooling fluid, such as air, may be passed through the volume between the spar and the back side of the coversheet to aid in cooling the coversheet. Due to this back side cooling, dual walled components may allow use of higher operating temperatures than single walled components.

SUMMARY

In some examples, the disclosure described a method for repairing a dual walled component comprising a spar comprising a plurality of pedestals and a coversheet attached to the plurality of pedestals. The method may include removing a damaged portion of the coversheet from the dual walled component to expose a plurality of exposed pedestals and define a repair location and an adjacent coversheet portion. The method also may include attaching a material to the plurality of exposed pedestals and adjacent coversheet portion using directed energy deposition material addition to form a repaired coversheet portion.

In some examples, the disclosure describes a dual walled component that includes a spar including a plurality of pedestals, a coversheet attached to a first set of pedestals from the plurality of pedestals, and a repaired coversheet portion attached to a second set of pedestals from the plurality of pedestals and to the coversheet. The repaired coversheet portion includes material attached using directed energy deposition material addition.

The details of one or more examples are set forth in the accompanying drawings and the description below. Other features, objects, and advantages will be apparent from the description and drawings, and from the claims.

DETAILED DESCRIPTION

Figure 1:
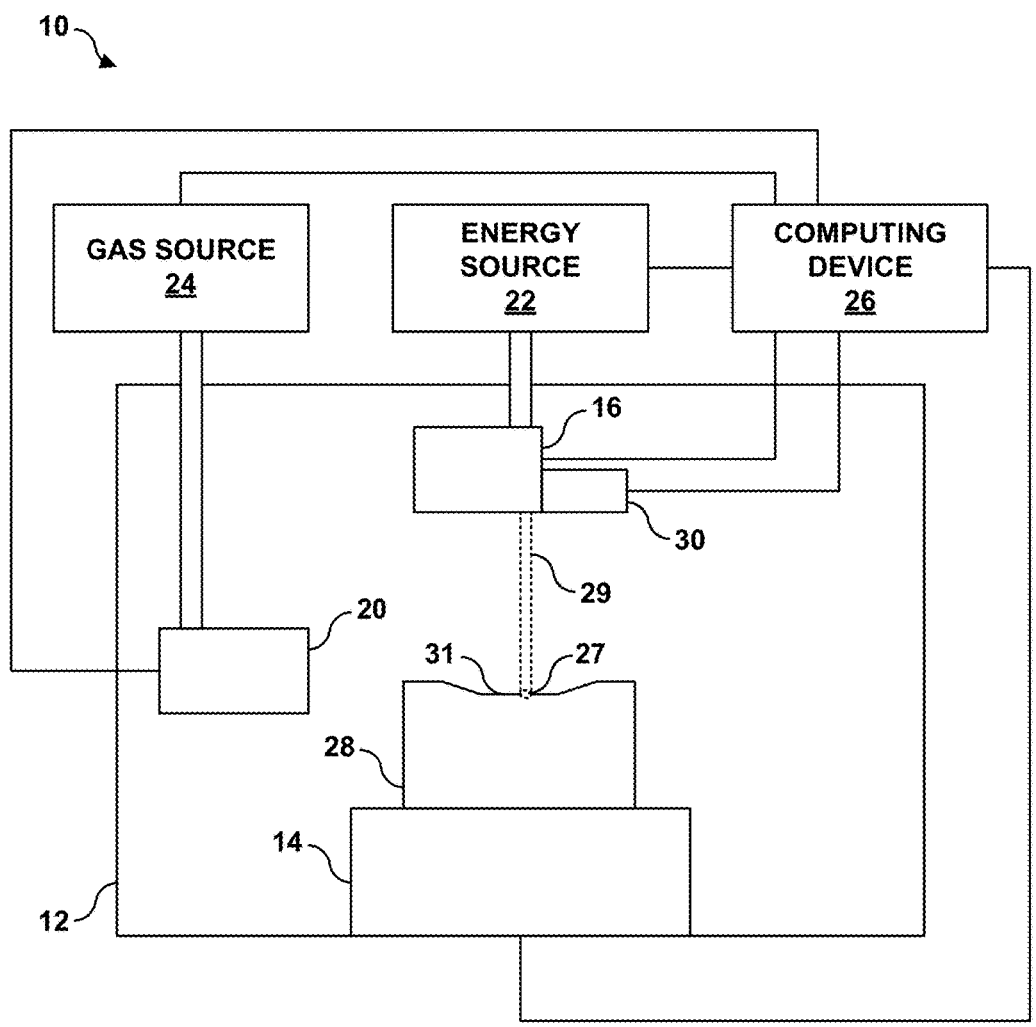
FIG. 1 is a conceptual and schematic diagram illustrating an example system for repairing a dual walled component using directed energy deposition material addition.

The disclosure describes techniques for repairing a dual walled component using directed energy deposition material addition (DED MA). As described above, a dual walled component includes a spar and a coversheet or outer wall. The spar may include a plurality of pedestals to which the coversheet is attached.

Although the dual walled component may allow use of high temperatures due to the cooling provided by the back side cooling channels, the coversheet may be relatively thin. Because of this, the coversheet may be relatively easily damaged, e.g., by mechanical impact or chemical reaction with species in the operating environment, such as calcia-magnesia-alumina-silicate (CMAS). Further, because the coversheet is relatively thin and the pedestals are relatively small (e.g., thousandths of an inch), repair of the coversheet may be relatively difficult. Hence, some damaged dual walled components may be discarded rather than repaired.

In accordance with examples of this disclosure, DED MA may be used to repair the coversheet and, in some examples, the pedestals of a dual walled component. For example, a portion of a coversheet may be damaged by mechanical impact with an object or reaction with a chemical species in the operating environment of the dual walled component. The damaged portion may be removed along with, in some examples, part of an undamaged portion of the coversheet adjacent to the damaged portion to define a repair location. Removing the damaged portion of the coversheet may expose some pedestals of the spar. DED MA then may be used to attach material to the plurality of exposed pedestals and adjacent coversheet and form a repaired coversheet portion.

In some examples, the DED MA technique may include positioning a preformed replacement coversheet portion at the repair location, then using DED MA to attach the preformed replacement coversheet portion to the exposed pedestals. In some examples, a powder also may be directed to an outer surface of the preformed replacement coversheet portion. DED MA may be used to join at least some of the powder to the outer surface of the preformed replacement coversheet portion, e.g., to fill depressions formed when the preformed replacement coversheet portion is attached to the exposed pedestals.

In some examples, the DED MA technique may include filling space between the plurality of exposed pedestals with a stop material. The stop material may define a surface substantially aligned with a pedestal-contacting surface of the adjacent coversheet portion, so that an inner surface (a surface toward the pedestals) of the repaired coversheet portion will be substantially aligned with the inner (pedestal-contacting) surface of the adjacent coversheet portion. After the stop material is filled in the space, powder and energy may be directed adjacent to the surface of the stop material and adjacent to the exposed pedestals and adjacent coversheet, to form the repaired coversheet portion attached to the exposed pedestals and the adjacent coversheet. In this way, the techniques described herein may be used to repair a dual walled component.

FIG. 1 is a conceptual and schematic diagram illustrating an example system 10 for repairing a dual walled component 28 using DED MA. System 10 may include an enclosure 12, which encloses a stage 14, an energy delivery head 16, a gas delivery device 20, and a material delivery device 30. System 10 also may include an energy source 22, which is operatively coupled to energy delivery head 16, and a gas source 24, which is fluidly connected to gas delivery device 20. System 10 further may include a computing device 26, which is communicatively connected to energy source 22, gas source 24, gas delivery device 20, energy delivery head 16, stage 14, and material delivery device 30. A dual walled component 28 is also positioned within enclosure 12.

Figure 2:
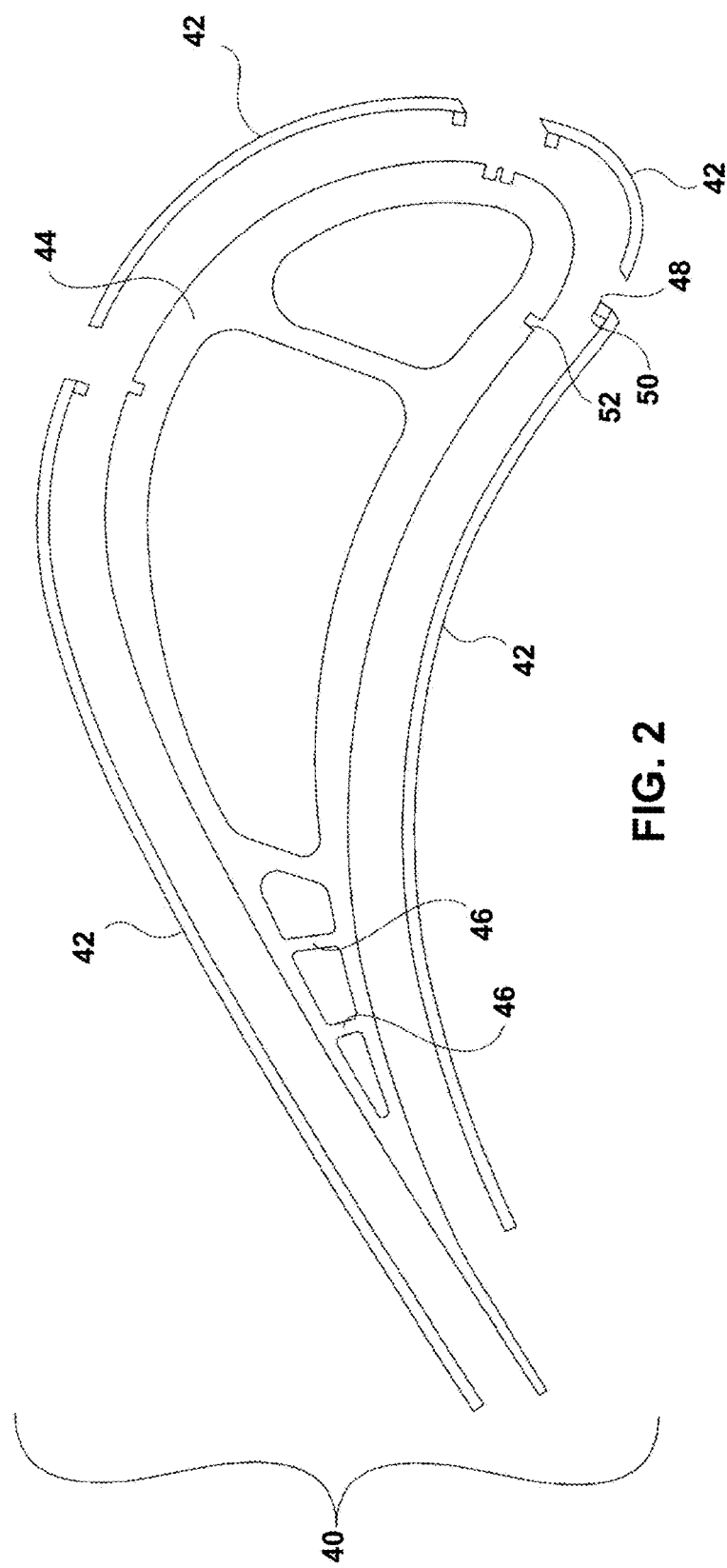
FIG. 2 is an exploded sectional view of an example dual walled component including a coversheet and a spar.

In some examples, dual walled component 28 may include a component of a gas turbine engine. For example, dual walled component 28 may include a part that forms a portion of a flow path structure or another portion of the gas turbine engine. Dual walled component 28 includes a plurality of parts (e.g., at least two), which are joined using e.g., brazing or diffusion bonding. FIG. 2 is an exploded sectional view of an example dual walled component 28 including a coversheet 42 and a spar 44, which may be brazed or diffusion bonded together. In the example of FIG. 2, dual walled component 28 is an airfoil 40 for a gas turbine engine. In other examples, dual walled component 28 may be a combustor liner, or the like. Each of coversheet 42 and spar 44 are preformed, and may be cast or wrought. In the example of FIG. 2, coversheet 42 includes a plurality of members (e.g., four members). In other examples, coversheet 42 may include more or fewer members.

Coversheet 42 is shaped to substantially correspond to an outer surface of spar 44. In some examples, coversheet 42 and spar 44 may be formed of similar materials, such as similar alloys. In other examples, coversheet 42 and spar 44 may be formed of different materials, selected to provide different properties. For example, spar 44 may be formed of a material selected to provide strength to component 40, while coversheet 42 is formed of a material selected to provide resistance to oxidation or a relatively low coefficient of thermal expansion. In some examples, the alloys from which coversheet 42 and spar 44 are formed may include a Ni-based alloy, a Co-based alloy, a Ti-based alloy, or the like.

Spar 44 may also include a plurality of pedestals on an outer surface of the walls of spar 44, to which coversheet 42 are joined. The plurality of pedestals may help define channels between spar 44 and coversheet 42 through which cooling fluid (e.g., air) may flow. In some examples, coversheet 42 and spar 44 include one or more locating features 48 including protrusion 50 of coversheet 42 and complementary depression 52 of spar 44. The locating features 48 may assist with positioning coversheet 42 relative to spar 44.

Returning to FIG. 1, enclosure 12 may substantially enclose (e.g., enclose or nearly enclose) stage 14, energy delivery head 16, gas delivery device 20, component 28, and material delivery device 30. In some examples, enclosure 12 may contain a substantially inert atmosphere (e.g., helium, argon, or the like) during operation of system 10. In some examples, enclosure 12 may be evacuated to form a substantial vacuum within enclosure 12. A vacuum within enclosure 12 may facilitate use of some types of energy, such as an electron beam.

In some examples, stage 14 may be configured to selectively position and restrain dual walled component 28 in place relative to stage 14 during formation or repair of component 28. In some examples, stage 14 is movable relative to energy delivery head 16, gas delivery device 20, and/or material delivery device 30. For example, stage 14 may be translatable and/or rotatable along at least one axis to position component 28 relative to energy delivery head 16, gas delivery device 20, and/or material delivery device 30. Similarly, in some examples, at least one of energy delivery head 16, gas delivery device 20, and/or material delivery device 30 may be movable relative to stage 14 to position the at least one of energy delivery head 16, gas delivery device 20, and/or material delivery device 30 relative to component 28. In some examples, as illustrated in FIG. 1, energy delivery head 16 may be coupled (e.g., mechanically attached) to material delivery device 30, such that positioning energy delivery head 16 relative to stage 14 also positions material delivery device 30 relative to stage 14.

Energy source 22 may include, for example, a laser source, such as a CO laser, a $CO_2$ laser, a Nd:YAG laser; an electron beam source, a plasma source; or the like. Energy source 22 may be selected to provide energy with a predetermined wavelength or wavelength spectrum that may be absorbed by the material to be added to component 28 during DED MA repair of dual walled component 28. Energy source 22 may be operatively connected to energy delivery head 16, which aims an energy beam 29 toward repair location 31 of dual walled component 28 during repair of dual walled component 28.

System 10 also includes gas source 24. Gas source 24 may include, for example, a source of helium, argon, or other substantially inert gas, which may function as a cooling gas. Gas source 24 is fluidically coupled to gas delivery device 20, which may be movable relative to dual walled component 28 under control of computing device 26.

System 10 also may include a material delivery device 30. Material delivery device 30 may be configured to deliver material to the location of component 28 being formed or repaired. The material then may be heated by energy delivered by energy delivery head 16 to add the material to dual walled component 28. In some examples, the material may be supplied by material delivery device 30 in powder form or wire form. In some examples, the material to be delivered to material delivery device 30 may include a composition substantially the same as (e.g., the same or nearly the same as) the composition of the material from which the outer wall of dual walled component 28 is formed. In other examples, the material to be delivered to material delivery device 30 may include a composition different from the composition of the material from which the outer wall of dual walled component 28 is formed.

In some examples, material delivery device 30 may be mechanically attached to or integrated into energy delivery head 16. In some examples, this may facilitate coordinated positioning of energy delivery head 16 relative to the location at which material is delivered. In other examples, material delivery device 30 may be separate from energy delivery head 16.

Computing device 26 may include, for example, a desktop computer, a laptop computer, a workstation, a server, a mainframe, a cloud computing system, or the like. Computing device 26 may include or may be one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality of computing device 26 may be provided within dedicated hardware and/or software modules.

Computing device 26 is configured to control operation of system 10, including, for example, stage 14, gas delivery device 20, gas source 24, energy source 22, energy delivery head 16, and/or material delivery device 30. Computing device 26 may be communicatively coupled to at least one of stage 14, gas delivery device 20, gas source 24, energy source 22, energy delivery head 16, and/or material delivery device 30 using respective communication connections. Such connections may be wireless and/or wired connections.

Computing device 26 may be configured to control operation of stage 14, energy delivery head 16, gas delivery device 20, and/or material delivery device 30 to position dual walled component 28 relative to energy delivery head 16, gas delivery device 20, and/or material delivery device 30. For example, as described above, computing device 26 may control stage 14, energy delivery head 16, gas delivery device 20, and/or material delivery device 30 to translate and/or rotate along at least one axis to position dual walled component 28 relative to energy delivery head 16, gas delivery device 20, and/or material delivery device 30.

Computing device 26 may control at least one of the power level of energy source 22, the focal spot size of the energy beam delivered adjacent to repair location 31 of dual walled component 28, the relative movement of the focal spot 27 of the energy beam 29 relative to dual walled component 28, a pause time between bursts of energy, the standoff between the focal point and repair location 31 of dual walled component 28, the angle of energy beam 29 relative to repair location 31, or tool path. The tool path may include the width of the overlap between adjacent passes of the energy beam focal spot and the build-up rate. Computing device 26 may control the at least one of these parameters to control the amount of material added to dual walled component 28 at a given time and/or to control metallurgical properties of the added material. In some examples, energy delivery head 16 may be scanned (e.g., translated) relative to repair location 31 of dual walled component 28 to scan the focal spot relative to repair location 31 of dual walled component 28, and the material may be fused in a general shape corresponding to the scanned path of the focal spot.

Figure 3:
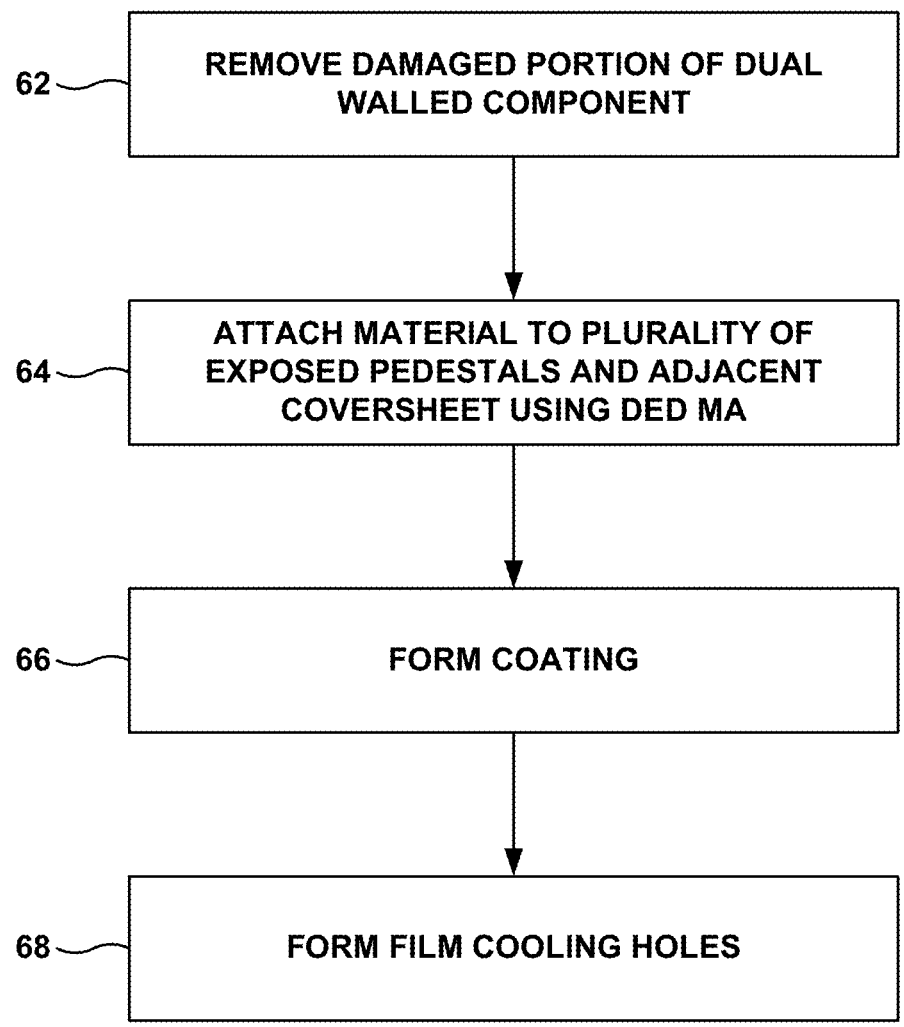
FIG. 3 is a flow diagram illustrating an example technique for repairing a dual walled component using directed energy deposition material addition.

In accordance with examples of this disclosure, system 10 may be used to repair the coversheet (e.g., coversheet 42 of FIG. 2) and, in some examples, the pedestals of dual walled component 28. FIG. 3 is a flow diagram illustrating an example technique for repairing a dual walled component using system 10. The technique of FIG. 3 will be described with concurrent reference to system 10 of FIG. 1 and the conceptual diagrams of FIGS. 4-6 for purposes of illustration only. However, it will be understood that in other examples, other systems may be used to perform the technique of FIG. 1, the technique of FIG. 3 may be used to repair other dual walled components, or both.

Figure 4:
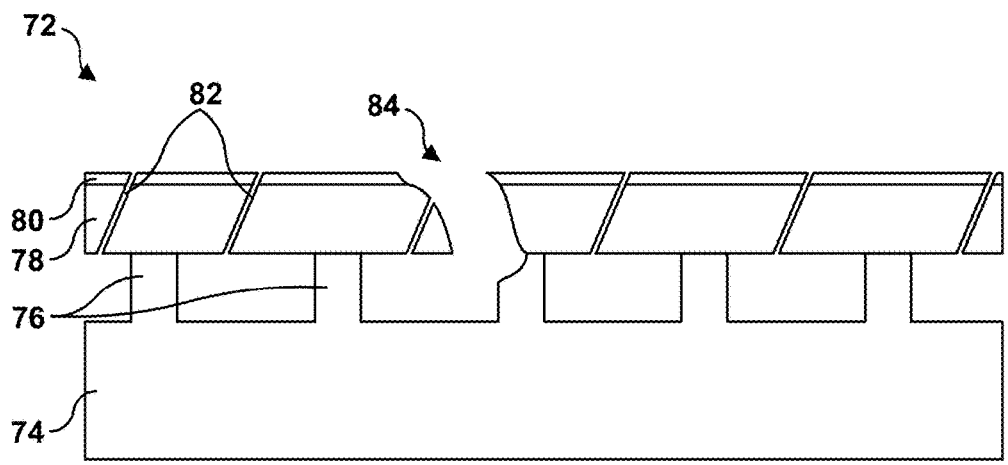
FIG. 4 is a conceptual and schematic diagram illustrating an example damaged dual walled component.

As shown in FIG. 4, a damaged dual walled component 72 includes a spar 74, which defines an inner wall of dual walled component 72 and includes a plurality of pedestals 76. A coversheet 78 or outer wall is attached to plurality of pedestals 76. In some examples, each of plurality of pedestals 76 may define a height of between about 0.005 inch (about 0.127 mm) and about 0.040 inch (about 1.016 mm). In some examples, a spacing between adjacent pedestals of plurality of pedestals 76 may be between about 0.015 inch (about 0.381 mm) and about 0.020 (about 0.508 mm).

In some examples, an external surface (opposite plurality of pedestals 76) of coversheet 78 may coated with a coating 80, which may include, for example, a thermal barrier coating. A thermal barrier coating may include a bond coat on coversheet 78 and a thermally insulative layer on the bond coat. The thermally insulative layer may include, for example, yttria or hafnia partially or fully stabilized with a rare earth oxide, such as yttria.

Coversheet 78 also may include a plurality of film cooling holes 82. Each of plurality of film cooling holes 82 may extend from an outer surface to an inner surface of coversheet 78. Each of plurality of film cooling holes 82 fluidically connects to a cavity defined by coversheet 78 and spar 74. Cooling fluid, such as air, may flow through the cavity and exit through film cooling holes 82 to help cool coversheet 78.

Damaged dual walled component 72 includes a damaged portion 84. In the example illustrated in FIG. 4, damaged portion 84 extends through the thickness of coversheet 78 and includes a portion of one of the plurality of pedestals 76. In other examples, damaged portion 84 may extend only partially through the thickness of coversheet 78, may not include a portion of one of the plurality of pedestals 76, or both. Damaged portion 84 may be due to mechanical impact, chemical reaction with an environmental species, or the like.

Figure 5:
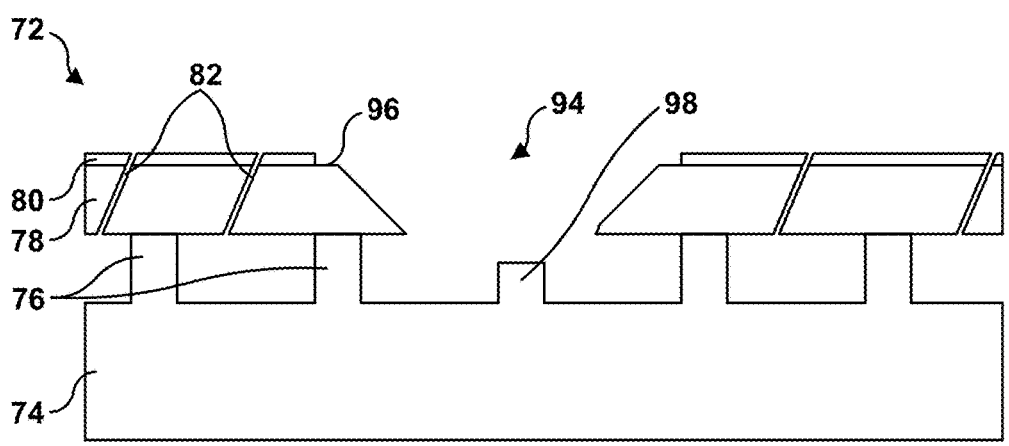
FIG. 5 is a conceptual and schematic diagram illustrating an example dual walled component after a damaged portion has been removed.

The technique of FIG. 3 includes removing a damaged portion 84 of a dual walled component 72 (62). The resulting dual walled component 72 with damaged portion 84 removed is shown in FIG. 5 In some examples, removing the damaged portion 84 of the dual walled component 72 (62) may include removing at least part of coating 80 on at least damaged portion 84 of dual walled component 72. In some examples, coating 80 may be removed from all of dual walled component 72. In other examples, coating 80 may be removed from the damaged portion 84 and an adjacent portion of coversheet 48, but not all of dual walled component 72. For example, as shown in FIG. 5, coating 80 may be removed to uncover part of outer surface 96 of coversheet 78. This may facilitate repair of coversheet 78 (e.g., joining of material to coversheet 78) and subsequent working of the repaired portion (e.g., machining the repaired portion to smooth the interface between the repaired portion and coversheet 78).

Removing damaged portion 84 (62) may include the damaged portion 84 of the coversheet 78, and, in some examples, an undamaged adjacent portion of coversheet 78, as shown in FIG. 5. By removing the undamaged adjacent portion of coversheet 78, a clean and undamaged portion of coversheet 78 may be exposed, which may facilitate attaching the material forming the repaired coversheet portion to the remainder of dual walled component 72.

In some examples, in addition to coversheet 78 being damaged, at least some of the plurality of pedestals 76 may be damaged, as shown in FIG. 4. Hence, in some examples, removing damaged portion 84 of dual walled component 72 (62) may include removing at least the damaged portions of any damaged pedestals 76.

Removing damaged portion 84 of dual walled component 72 (62) may include using mechanical techniques, such as grinding, drilling, cutting, or the like to remove the damaged portion 84. Removing damaged portion 84 of dual walled component 72 (62) may define a repair location 94 (FIG. 5) and an adjacent coversheet portion, and may expose one or more exposed pedestals 98 that were underlying damaged portion 84 of coversheet 78.

The technique of FIG. 3 also includes attaching a material to the at least one exposed pedestal 98 and adjacent coversheet portion using DED MA to form a repaired coversheet portion 102 (64). In some examples, attaching a material to the at least one exposed pedestal 98 and adjacent coversheet portion using DED MA to form repaired coversheet portion 102 (64) may include the technique of FIG. 7, which will be described in more detail below. In other examples, attaching a material to the at least one exposed pedestal 98 and adjacent coversheet portion using DED MA to form repaired coversheet portion 102 (64) may include the technique of FIG. 10, which also will be described in more detail below.

Figure 6:
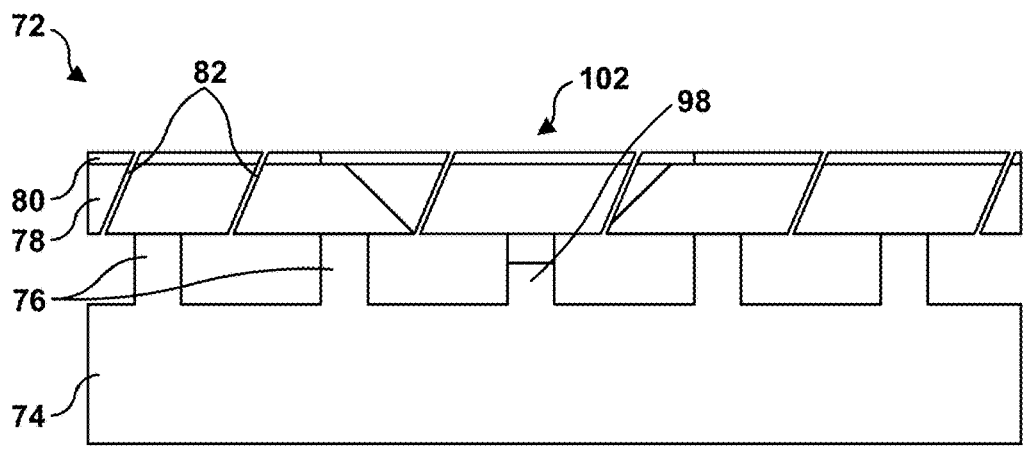
FIG. 6 is a conceptual and schematic diagram illustrating an example dual walled component including a portion that has been repaired using directed energy deposition material addition.

Regardless of the technique used for attaching the material to the at least one exposed pedestal 98 and adjacent coversheet portion using DED MA to form repaired coversheet portion 102 (64), repaired coversheet portion 102 may be attached to any exposed pedestals 98 and portions of coversheet 78 adjacent to repair location 94. FIG. 6 is a conceptual and schematic diagram illustrating dual walled component 72 including a repaired coversheet portion 102 that has been repaired using directed energy deposition material addition.

In some examples, repaired coversheet portion 102 may include the same alloy as coversheet 78. For example, if coversheet 78 includes a Ni- or Co-based superalloy, repaired coversheet portion 102 may include the same Ni- or Co-based superalloy. In other examples, repaired coversheet portion 102 may include an alloy having a different composition than coversheet 78. For example, damaged portion 84 may be have been damaged due to localized conditions, such as higher temperatures, exposure to certain environmental contaminants, or higher mechanical stresses, which are not common to all portions of coversheet 78. In some such examples, repaired coversheet portion 102 may include an alloy having a composition selected to better resist the localized conditions compared to the alloy from which the remainder of coversheet 78 is formed. Regardless of the composition of repaired coversheet portion 102 compared to coversheet 78, the composition of repaired coversheet portion 102 may be selected such that the coefficient of thermal expansion is sufficiently similar that thermal cycling of dual walled component 72 does not result in sufficient levels of stress to cause of the interface between coversheet 78 and repaired coversheet portion 102 to crack or fail.

As shown in FIG. 6, in some examples, attaching the material to the at least one exposed pedestal 98 and adjacent coversheet portion using DED MA to form repaired coversheet portion 102 (64) may also include attaching material to at least one exposed pedestal 98 to repair the at least one exposed pedestal 98. In some examples, the material used to repair at least one exposed pedestal 98 may be the same as the material (e.g., alloy) used to form repaired coversheet portion 102. In other examples, the material used to repair at least one exposed pedestal 98 may be the same as the material (e.g., alloy) used to form repaired coversheet portion 102, e.g., if the at least one exposed pedestal 98 includes a different material than coversheet 78.

In some examples, the technique of FIG. 3 may optionally include forming coating 80 on repaired coversheet portion 102 and any other exposed outer surface of coversheet 78 (66). In some examples, coating 80 on repaired coversheet portion 102 may be the substantially the same as (e.g., the same as or nearly the same as) coating 80 on coversheet 78. In other examples, coating 80 on repaired coversheet portion 102 may be different than coating 80 on coversheet 78. Regardless, in some examples, coating 80 may be a thermal barrier coating and may include a bond layer and at least one thermally insulative layer.

In some examples, the technique of FIG. 3 may optionally include forming film cooling holes 82 in repaired coversheet portion 102 (68). Forming film cooling holes 82 may utilize mechanical working, such as drilling, energy drilling, such as laser drilling, or the like. In some examples, film cooling holes 82 may be formed at locations corresponding to locations of previous cooling holes in damaged portion 84. In this way, the technique of FIG. 3 may utilize DED MA to repair coversheet 78 and, optionally, at least one pedestal of plurality of pedestals 76.

Figure 7:
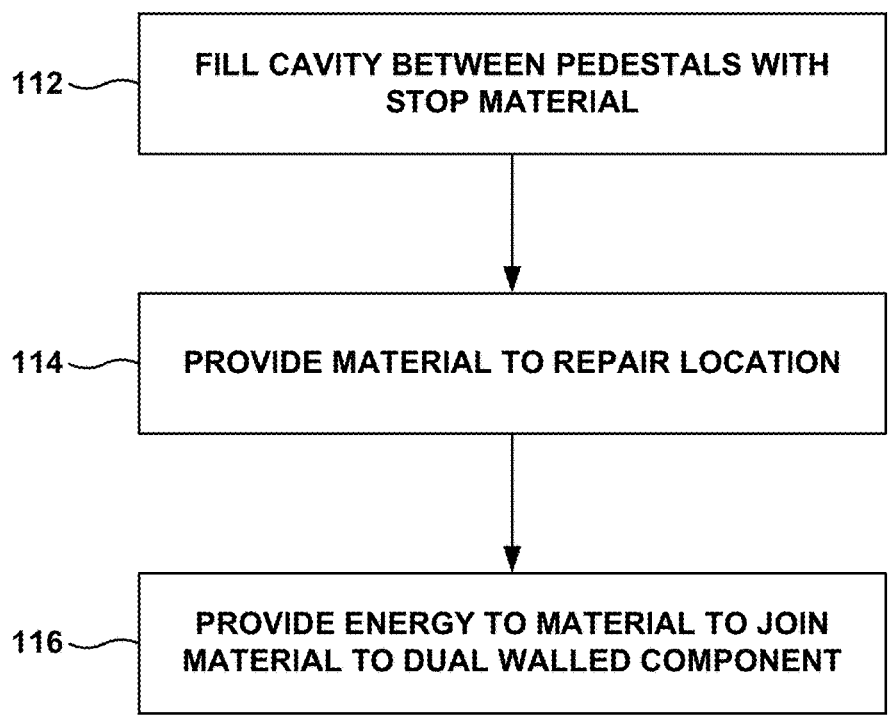
FIG. 7 is a flow diagram illustrating an example technique for repairing a dual walled component using directed energy deposition material addition and a stop material.

DED MA may be utilized in various ways for attaching the material to the at least one exposed pedestal 98 and adjacent coversheet portion using DED MA to form repaired coversheet portion 102 (64). FIG. 7 is a flow diagram illustrating an example technique for repairing a dual walled component using DED MA and a stop material. The technique of FIG. 7 will be described with concurrent reference to system 10 of FIG. 1 and the conceptual diagrams of FIGS. 8 and 9 for purposes of illustration only. However, it will be understood that in other examples, other systems may be used to perform the technique of FIG. 1, the technique of FIG. 7 may be used to repair other dual walled components, or both.

Figure 8:
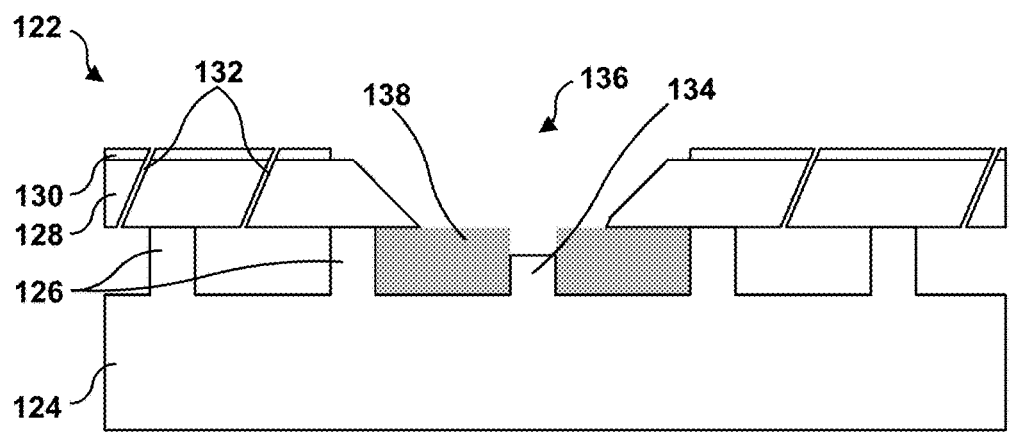
FIG. 8 is a conceptual and schematic diagram illustrating an example dual walled component after a damaged portion has been removed and spaces around pedestals filled with stop material.

FIG. 8 is a conceptual and schematic diagram illustrating an example dual walled component 122 after a damaged portion has been removed and spaces around pedestals filled with stop material 138. Dual walled component 122 may be substantially similar to dual walled component 72 illustrated in FIGS. 4-6, aside from the differences described herein. For example, dual walled component 122 includes spar 124, which defines a plurality of pedestals 126. Coversheet 128 may be attached to each pedestal of plurality of pedestals 126, e.g., using diffusion bonding or brazing. A coating 130 is on the external surface of coversheet 128. Coversheet 128 also includes a plurality of film cooling holes 132. These structures may be substantially similar to or the same as the corresponding structures shown in FIGS. 4-6. As shown in FIG. 8, a damaged portion of coversheet 128, coating 130, and exposed pedestal 134 has been removed, defining a repair location 136.

The technique of FIG. 7 includes filling a cavity between pedestals 126 with stop material 138 (112). For example, a cavity between exposed pedestal 134 and adjacent pedestals 126 may be filled with stop material 138 such that an outer surface of the stop material 138 is substantially aligned with an inner surface of the adjacent portions of coversheet 128.

Stop material 138 may include a high melting temperature refractive material that does not react with adjacent portions of dual walled component 122 (e.g., exposed pedestal 134, plurality of pedestals 126, spar 124, and/or coversheet 128). For example, the high melting temperature refractive material may have a melting temperature higher than the temperature to which the material is heated that is added to dual walled component 122 using DED MA. In some examples, the high melting temperature refractive material may have a melting temperature of at least 4,500° F. (about 2480° C.) For example, stop material 138 may include an oxide, such as yttrium oxide, aluminum oxide, or the like, mixed with a binder. The binder may include, for example, a water-based or alcohol-based binder. In some examples, stop material 138 that includes an oxide and a binder may be in the form of a tape, a preform, a rope, a powder, or the like.

In other examples, stop material 138 may include a refractory metal, such as molybdenum; or the like. The refractory metal may be in the form of a sheet or other preform. In some examples, stop material 138 may be shaped to define the outer surface of stop material 138 substantially aligned with an inner surface of the adjacent portions of coversheet 128 and, if applicable, to help define a shape of any portions of exposed pedestal 134 to be repaired. Alternatively or additionally, the tape, preform, or rope may be shaped to define the outer surface of stop material 138 substantially aligned with tops of undamaged exposed pedestals.

Figure 9:
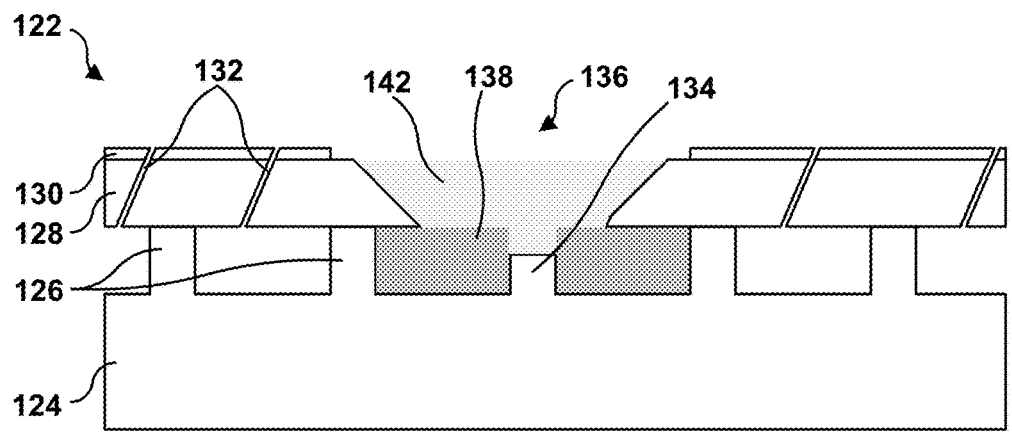
FIG. 9 is a conceptual and schematic diagram illustrating an example dual walled component after a damaged portion has been removed, spaces around pedestals have been filled with stop material, and material has been introduced to a repair location.

Once cavity between pedestals 126 is filled with stop material 138 (112), material may be provided to repair location 136 (114). FIG. 9 is a conceptual and schematic diagram illustrating an example dual walled component 122 after a damaged portion has been removed, spaces around pedestals 126 and 134 filled with stop material 138 and material 142 is introduced to repair location 136. In some examples, the material may be a powder, and may be spread or otherwise placed in repair location 136, as shown in FIG. 9. For example, at least a portion of dual walled component 122 that includes repair location 136 may be submerged in a powder bed so that material 142 is located at repair location 136 as shown in FIG. 9. In other examples, rather than a layer of material 142 being disposed at repair location 136, material delivery device 30 may be used to introduce material to repair location 136 during the DED MA technique.

The technique of FIG. 7 further includes providing energy to material 142 to join material 142 to dual walled component 122 (116). For example, energy delivery head 16 may be used to direct and focus energy at selected locations of material 142 to melt or sinter the material at the selected locations and join the material to exposed pedestal 134 and coversheet 128 adjacent to repair location 136. As described above, computing device 26 may control energy delivery head 16, stage 14, or both to position focal spot 27 within material 142. Computing device 26 may control energy delivery head 16, stage 14, or both to move or scan focal spot 27 within repair location to build up a repaired coversheet portion (which may be similar to repaired coversheet portion 102 of FIG. 6). For example, computing device 26 may control energy delivery head 16, stage 14, or both to direct focal spot 27 adjacent to exposed pedestal 134 to join material 142 to exposed pedestal 134, then scan focal spot 27 in sequential rows to build up a plurality of layers of material 142 that are joined to previously formed layers and to coversheet 128. Computing device 26 may control energy delivery head 16, stage 14, or both to direct focal spot 27 to join material 142 to previously formed layers and coversheet 128 until the joined material 142 is substantially continuous with the outer surface of coversheet 128. In this way, DED MA may be used to build up a repaired coversheet portion that fills the repair location 136.

After formation of the repaired coversheet portion, stop material 138 may be removed. For example, dual walled component 122 may be heated to heat stop material 138 in examples in which stop material 138 includes a refractory oxide and a binder. Stop material 138 may be heated to a temperature sufficient to burn the binder, creating a powder including the burned binder and the refractory oxide. This powder then may be removed, e.g., by flowing a pressurized fluid through the cavities between coversheet 128 and spar 124. In other examples, such as examples in which stop material 138 includes a refractory metal, a chemical etching technique may be used to remove stop material 138. The etchant may be selected to react with the refractory metal while not reacting with the parts of dual walled component 122. The technique of FIG. 7 optionally may include forming a coating (66), forming film cooling holes (68), or both, as described with respect to FIG. 3.

Figure 10:
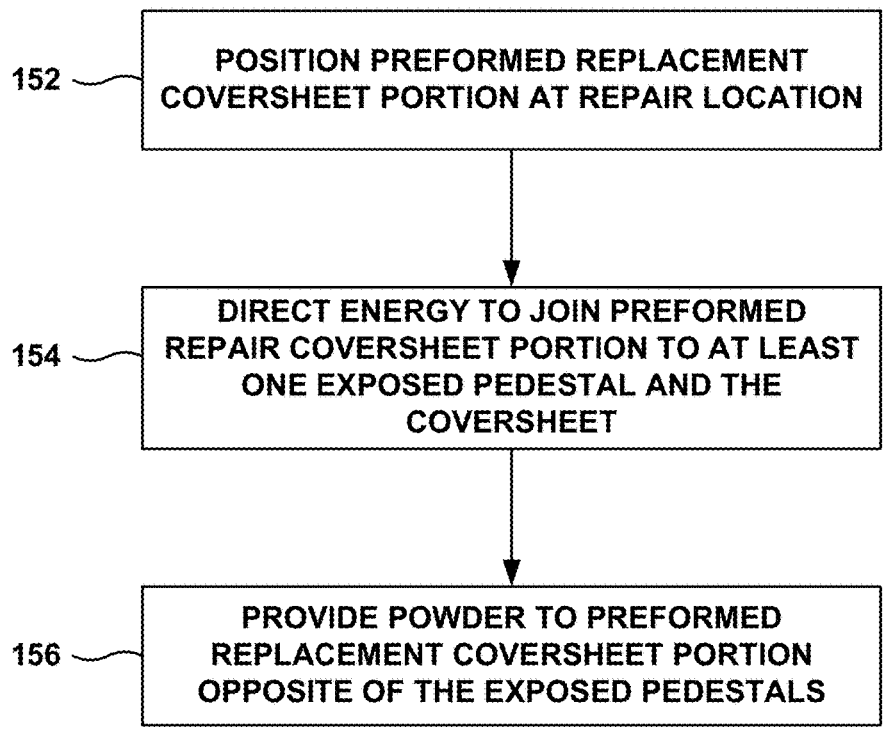
FIG. 10 is a flow diagram illustrating an example technique for repairing a dual walled component using directed energy deposition material addition and a preformed coversheet insert.

In other examples, instead of using the technique illustrated in FIG. 7, attaching the material to the at least one exposed pedestal 98 and adjacent coversheet portion using DED MA to form repaired coversheet portion 102 (64) may include utilizing a preformed replacement coversheet portion. FIG. 10 is a flow diagram illustrating an example technique for repairing a dual walled component using directed energy deposition material addition and a preformed coversheet insert. The technique of FIG. 10 will be described with concurrent reference to system 10 of FIG. 1 and the conceptual diagram of FIG. 11 for purposes of illustration only. However, it will be understood that in other examples, other systems may be used to perform the technique of FIG. 1, the technique of FIG. 10 may be used to repair other dual walled components, or both.

Figure 11:
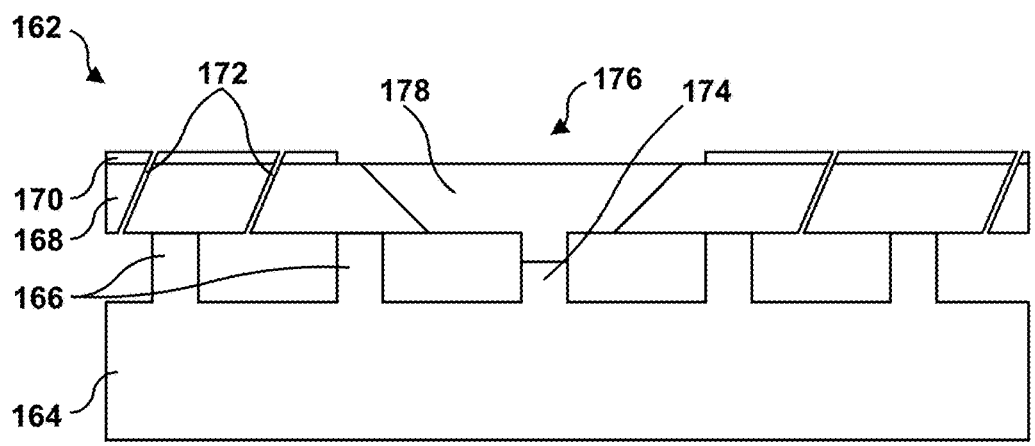
FIG. 11 is a conceptual and schematic diagram illustrating an example dual walled component after a damaged portion has been removed and a preformed replacement coversheet portion placed at the repair location.

FIG. 11 is a conceptual and schematic diagram illustrating an example dual walled component after a damaged portion has been removed and a preformed replacement coversheet portion placed at the repair location. Dual walled component 162 may be substantially similar to dual walled component 72 illustrated in FIGS. 4-6, aside from the differences described herein. For example, dual walled component 162 includes spar 164, which defines a plurality of pedestals 166. Coversheet 168 may be attached to each pedestal of plurality of pedestals 166, e.g., using diffusion bonding or brazing. A coating 170 is on the external surface of coversheet 168. Coversheet 168 also includes a plurality of film cooling holes 172. These structures may be substantially similar to or the same as the corresponding structures shown in FIGS. 4-6. As shown in FIG. 11, a damaged portion of coversheet 168, coating 170, and exposed pedestal 174 has been removed, defining a repair location 176.

The technique of FIG. 10 may include positioning a preformed replacement coversheet portion 178 at a repair location 176 (152). Preformed replacement coversheet portion 178 may define a shape substantially conforming to that of the portion of coversheet 168 (and, optionally, at least one exposed pedestal 174) that was removed when removing the damaged portion of coversheet 168. In some examples, preformed replacement coversheet portion 178 may be formed by machining a piece of material, cutting a piece of a manufactured coversheet, or using DED MA.

The technique of FIG. 10 also may include directing energy to join preformed replacement coversheet portion 178 to at least one exposed pedestal 174 and coversheet 168 (154). For example, energy delivery head 16 may be used to direct and focus energy at selected locations of material preformed replacement coversheet portion 178 to melt or sinter the preformed replacement coversheet portion 178 at the selected locations and join preformed replacement coversheet portion 178 to exposed pedestal 174 and coversheet 168 adjacent to repair location 176. As described above, computing device 26 may control energy delivery head 16, stage 14, or both to position focal spot 27 at selected locations of preformed replacement coversheet portion 178 to fusion weld preformed replacement coversheet portion 178 to at least one exposed pedestal 174 and coversheet 168.

In some examples, the technique of FIG. 10 additionally may include providing powder to preformed replacement coversheet portion 178 on a side opposite to the at least one exposed pedestal 174, adjacent to coversheet 168, or both (156). For example, material delivery device 30 may be used to introduce material to repair location 176 during the DED MA technique. Computing device 26 may control material delivery device 30 (which may be attached to or integral with energy delivery head 16) to provide material (e.g., powder) to the outer surface of preformed replacement coversheet portion 178 at selected locations of preformed replacement coversheet portion 178. The selected locations may include, for example, adjacent to the interface between coversheet 168 and preformed replacement coversheet portion 178 or above at least one exposed pedestal 174. Computing device 26 may control energy delivery head 16 to aim focal spot 27 at the powder to join the powder to preformed replacement coversheet portion 178. The powder may fill in any gaps between coversheet 168 and preformed replacement coversheet portion 178. Additionally or alternatively, the powder may fill any depressions formed due to flowing of preformed replacement coversheet portion 178 during the welding process of preformed replacement coversheet portion 178 to at least one exposed pedestal 174. For example, if the tolerance between preformed replacement coversheet portion 178 and at least one exposed pedestal 174 is such that there is a gap between preformed replacement coversheet portion 178 and at least one exposed pedestal 174, material from preformed replacement coversheet portion 178 adjacent to at least one exposed pedestal 174 may flow when exposed to focal spot 27 during joining of preformed replacement coversheet portion 178 and at least one exposed pedestal 174. Material provided by material deposition head 30 to the surface opposite at least one exposed pedestal 174 may be used to fill the depression caused by the flowing of preformed replacement coversheet portion 178.

After joining of preformed replacement coversheet portion 178 to coversheet 168 and at least one exposed pedestal 174 to form the repaired coversheet portion, the technique of FIG. 7 optionally may include forming a coating (66), forming film cooling holes (68), or both, as described with respect to FIG. 3.

As will be appreciated, in these ways DED MA may be used to repair coversheets and, optionally, pedestals of dual walled components, such as combustor liners or gas turbine engine blades. This may facilitate repair of dual walled components rather than requiring damaged dual walled components to be discarded and replaced with new dual walled components, thus providing cost savings.

Various examples have been described. These and other examples are within the scope of the following claims.

The invention claimed is:

1. A method for repairing a dual walled component comprising a spar comprising a plurality of pedestals and a coversheet attached to the plurality of pedestals, the method comprising:
   removing a damaged portion of the coversheet from the dual walled component to expose a plurality of exposed pedestals and define a repair location and an adjacent coversheet portion, wherein the plurality of pedestals comprises the plurality of exposed pedestals, and wherein the coversheet is attached to the plurality of pedestals;
   positioning a preformed replacement coversheet portion at the repair location;
   directing energy at each of a plurality of locations at which the preformed replacement coversheet portion is adjacent to the plurality of exposed pedestals to join the preformed replacement coversheet portion to the plurality of exposed pedestals; and
   providing a powder to a side of the preformed replacement coversheet portion opposite of the plurality of exposed pedestals, wherein the energy joins at least some of the powder to the preformed replacement coversheet portion at at least one location adjacent to an exposed pedestal of the plurality of exposed pedestals.

2. The method of claim 1, wherein the powder substantially fills a depression in the preformed replacement coversheet portion made from joining the preformed replacement coversheet portion to the exposed pedestal.

3. The method of claim 1, further comprising:
   filling a space between the plurality of exposed pedestals with a stop material, wherein the stop material defines a surface substantially aligned with a pedestal-contacting surface of the adjacent coversheet portion;
   directing the powder to the surface of the stop material;
   directing energy to the powder at locations adjacent to the stop material, the plurality of exposed pedestals, and the adjacent coversheet portion to form the repaired coversheet portion by directed energy deposition material addition.

4. The method of claim 1, wherein the repaired coversheet portion comprises a first alloy, wherein the adjacent coversheet portion comprises a second alloy substantially similar to the first alloy.

5. The method of claim 1, wherein the repaired coversheet portion comprises a first alloy, wherein the adjacent coversheet portion comprises a second, different alloy.

6. The method of claim 1, wherein removing the damaged portion of the coversheet comprises removing at least a damaged portion of at least one pedestal of the plurality of pedestals, wherein the coversheet is attached to the at least one pedestal prior to removing the damaged portion of the coversheet.

7. The method of claim 1, wherein removing the damaged portion of the coversheet comprises removing an undamaged portion of the coversheet, wherein the undamaged portion of the coversheet is adjacent to the damaged portion of the coversheet.

8. The method of claim 1, further comprising:
   forming at least one film cooling hole in the repaired portion of the coversheet.

9. The method of claim 1, further comprising:
   forming a thermal barrier coating on at least the repaired portion of the coversheet.

* * * * *